United States Patent Office 3,272,709
Patented Sept. 13, 1966

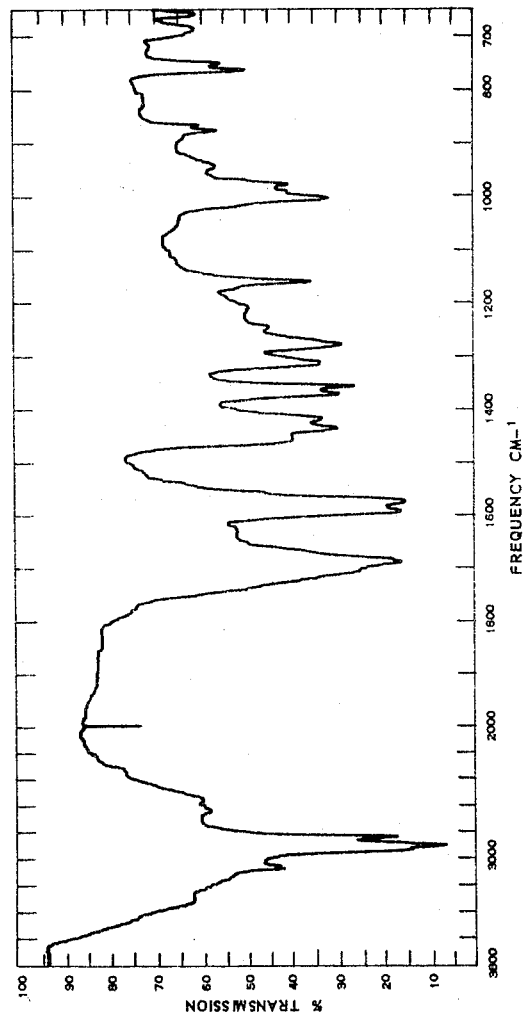

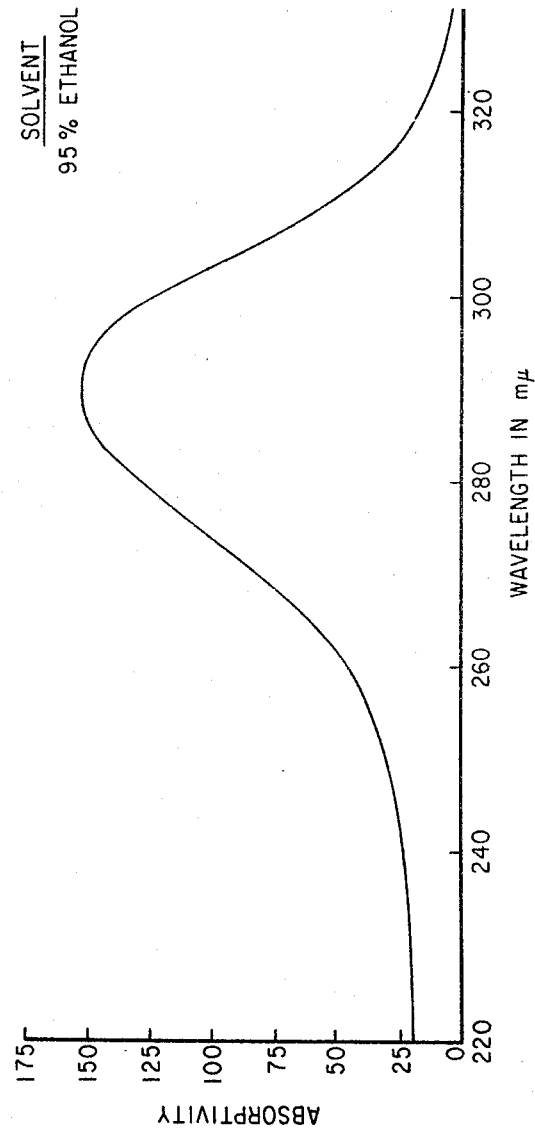

3,272,709
ANTIBIOTIC MELROSPORUS AND METHOD OF PRODUCTION
Malcolm E. Bergy, Kalamazoo, and William L. Lummis, Alamo Township, Kalamazoo County, Mich., assignors to The Upjohn Company, Kalamazoo, Mich., a corporation of Delaware
Filed Apr. 22, 1964, Ser. No. 361,849
7 Claims. (Cl. 167—65)

This invention relates to a composition of matter and to a process for the production thereof. More particularly, this invention relates to a new compound, melrosporous (U–22956), and to a process for its production.

The compound of this invention is an elaboration product of a melrosporus-producing actinomycete. It has the property of adversely affecting the growth of Gram-positive and Gram-negative bacteria, for example, *Staphylococcus aureus, Streptococcus faecalis, Bacillus subtilis, Bacillus cereus, Proteus vulgaris, Salmonella gallinarum, Klebsiella pneumoniae, Escherichia coli, Salmonella pullorum,* and *Streptococcus hemolyticus*. It also has the property of adversely affecting the growth of various fungi, for example, *Nocardia asteroides, Blastomyces dermatitidis, Coccidioides immitis, Cryptococcus neoformans, Histoplasma capsulatum,* and *Microsporum canis*. Melrosporus can be used alone or in combination with other antibacterial or antifungal agents to prevent the growth or reduce the number of susceptible organisms present in various environments. For example, it is useful for controlling the infection of silkworms caused by pathogenic cultures of *B. subtilis*; it is also useful as an oil preservative, for example, as a bacteriostatic agent to inhibit the growth of certain microorganisms that cause spoilage in cutting oils. Also, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays and in other biological media. It can also be used as a feed supplement to promote the growth of animals, for example, mammals, birds, fish and reptiles.

THE MICROORGANISM

The actinomycete used according to this invention has been designated as *Streptomyces fervens* var. *melrosporus* var. nova. One of its strain characteristics is the production of melrosporus. A subculture of this variety can be obtained from the permanent collection of the Northern Utilization and Research Division, Agricultural Research Service, U.S. Department of Agriculture, Peoria, Illinois, U.S.A. The accession number in this repository is NRRL 3117.

*Streptomyces fervens* var. *melrosporus*, NRRL 3117, has a cottony-pink aerial growth, red reverse and yellow or brown pigment on most media. Sporophores are biverticillate.

Macroscopic and microscopic observations on *Streptomyces fervens* var. *melrosporus*, NRRL 3117, are given in the following tables:

Table I.—Appearance on Ektachrome.
Table II.—Assimilation of carbon compounds in a synthetic medium.
Table III.—Cultural characteristics.

*Streptomyces fervens* var. *melrosporus* appears to be a variant of *Streptomyces fervens*, NRRL 2755. There are distince differences in macroscopic and microscopic properties as can be observed from the following tables. Also, *Streptomyces fervens*, NRRL 2755, does not produce melrosporus.

Table I

Appearance of *S. fervens* var. *melrosporus* and *S. fervens* on Ektachrome [1]

| Agar Medium | *S. fervens* var. *melrosporus* | *S. fervens* |
| --- | --- | --- |
| Bennett's: | | |
| Surface | Pink | Pink. |
| Reverse | Red-tan | Red-tan. |
| Czapek's Sucrose: | | |
| Surface | Pale pink | Pale pink. |
| Reverse | Faint pink-tan | Faint pink. |
| Maltose Tryptone: | | |
| Surface | Pink | Pink. |
| Reverse | Red-tan | Red-tan. |
| Peptone-Iron: | | |
| Surface | Colorless | Colorless. |
| Reverse | Brown | Brown. |
| 0.1% Tyrosine: | | |
| Surface | Pale pink | Trace pink. |
| Reverse | Brown | Brown. |
| Casein Starch: | | |
| Surface | Pale pink | Colorless. |
| Reverse | Brown-tan | Pink-tan. |

[1] Dietz, A. Ektachrome transparencies as aids in actinomycete classification, Annals of the N.Y. Academy of Science, 60: 152–154, 1954.

Table II

Assimilation of Carbon Compounds in Synthetic Medium (J. Bact., 56, 107–114 (1948))

| | *S. fervens* var. *melrosporus* | *S. fervens* |
| --- | --- | --- |
| Control | + | (−) |
| 1. D-xylose | (+) | + |
| 2. L-arabinose | + | + |
| 3. Rhamnose | (+) | + |
| 4. D-fructose | + | + |
| 5. D-galactose | + | + |
| 6. D-glucose | + | + |
| 7. D-mannose | + | + |
| 8. Maltose | + | + |
| 9. Sucrose | + | + |
| 10. Lactose | + | + |
| 11. Cellobiose | + | + |
| 12. Raffinose | + | + |
| 13. Dextrin | + | + |
| 14. Inulin | + | + |
| 15. Soluble starch | + | + |
| 16. Glycerol | + | + |
| 17. Dulcitol | + | + |
| 18. D-mannitol | + | + |
| 19. D-sorbitol | + | + |
| 20. D L-inositol | + | + |
| 21. Salicin | − | (−) |
| 22. Phenol | − | (−) |
| 23. Cresol | − | (−) |
| 24. Na formate | − | (−) |
| 25. Na oxalate | (+) | + |
| 26. Na tartrate | (+) | (−) |
| 27. Na salicylate | − | + |
| 28. Na acetate | − | + |
| 29. Na citrate | + | (−) |
| 30. Na succinate | + | + |

+ Positive assimilation.
− Negative assimilation.
(−) Slight growth, no assimilation.
(+) Positive assimilation, only slight growth.

Table III
Cultural characteristics of *Streptomyces fervens* var. *melrosporus* and *Streptomyces fervens*

| Medium | S. fervens var. melrosporus | S. fervens |
|---|---|---|
| Peptone-Iron Agar | No aerial growth. Brown vegetative growth. Melanin +. | No aerial growth. Brown vegetative growth. Melanin +. |
| Calcium Malate Agar | No aerial growth. Pale tan vegetative growth. No pigment. Malate not solubilized. | No aerial growth. Trace pink vegetative growth. No pigment. Malate not solubilized. |
| Glucose Asparagine Agar | Pink aerial growth. Red-tan reverse. Yellow pigment. | Trace pink aerial. Red vegetative growth. Yellow pigment. |
| Skim Milk Agar | No aerial growth. Red vegetative growth. Red-tan pigment. Casein not hydrolyzed. | No aerial growth. Red-tan vegetative growth. Yellow pigment. Casein not hydrolized. |
| Xanthine Agar | Pink aerial growth. Pink-tan reverse. Pale tan pigment. Xanthine not solubilized. | Very slight trace pink aerial growth. Red reverse. Yellow pigment. Xanthine not solubilized. |
| Tyrosine Agar | Deep pink aerial growth. Brown reverse. Brown pigment. Tyrosine solubilized. | No aerial growth. Red-tan vegetative growth. Brown-tan pigment. Tyrosine solubilized. |
| Casein Starch Agar | Cottony pink aerial growth. Pink reverse. Trace yellow pigment. Starch hydrolyzed. | Very slight trace pink aerial growth. Pink-tan reverse. Pale yellow pigment. Starch hydrolyzed. |
| Tomato Paste Oatmeal Agar | Cottony pink aerial growth. Red reverse. Yellow pigment. | No aerial growth. Red vegetative growth. Yellow pigment. |
| Bennett's Agar | Cottony pink aerial growth. Red-tan reverse. Yellow-tan pigment. Good growth at 18°-37° C. | Rose aerial growth. Red reverse. Yellow-tan pigment. Best growth at 18°-28° C., good at 37° C. |
| Czapek's Sucrose Agar | Cottony pale pink aerial growth. Pale pink reverse. No pigment. Fair growth at 18°-37° C. | Poor colorless aerial. Poor colorless vegetative. No pigment. Fair growth at 18°-37° C. |
| Maltose Tryptone Agar | Cottony pink aerial growth. Red reverse. Pale yellow pigment. Good growth at 18°-37° C. | Rose aerial growth. Red reverse. Pale yellow-tan pigment. Good growth at 18°-37° C. |
| Nutrient Nitrate Broth | No reduction. | Reduction. |
| Synthetic Nitrate Broth | No reduction. | Reduction. |

The new compound of the invention is produced when the elaborating organism is grown in an aqueous nutrient medium under submerged aerobic conditions. It is to be understood that, for the preparation of limited amounts, surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed brewers' yeast with milk solids, pancreatic digest of casein, distiller's solubles, animal peptone liquors, meat and bone scraps, and like nitrogenous sources. A combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to the satisfactory growth of microorganism, for example, between about 18° and 40° C. and preferably between about 26° and 30° C. Ordinarily, optimum production of the compound is obtained in from about 2 to 10 days. The medium normally stays fairly close to neutral, or on the acid side, during the fermentation. The final pH is dependent, in part on the buffers present, and in part on the initial pH of the culture medium which is advantageously adjusted to about pH 7.2 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active, vegetative inoculum has thus been secured, it is transferred asceptically to large vessels or tanks. The medium in which the vegetative inoculum is produced can be the same as, or different from, that utilized for the production of the new compound as long as it is such that a good growth of the microorganism is obtained.

The new compound of the invention, melrosporus, is an acidic substance having the empirical formula $C_5H_7NO_4$. It is soluble in water; water-miscible alcohols, for example, methanol, ethanol, 1- and 2-propanols, and tert-butyl alcohol; water-immiscible esters, for example, ethyl acetate, amyl acetate, butyl acetate, and like aliphatic esters; water immiscible alcohols such as 1-butanol and 2-butanol. Melrosporus is slightly soluble in ether, hexane and cyclohexane.

A variety of procedures can be employed in the isolation and purification of melrosporus, for example, solvent extraction, liquid-liquid distribution in a Craig apparatus, the use of adsorbents, and crystallization from solvents. Solvent extraction procedures are preferred for commercial production inasmuch as they are less time consuming and less expensive, and higher recovery yields are obtained thereby.

In a preferred process, melrosporus is recovered from its culture medium by separation of the mycelium and undissolved solids from the fermentation broth by conventional means such as by filtration or centrifugation. The antibiotic is then extracted from the filtered or centrifuged beer. For the extraction of melrosporus the solvents listed above can be used; ethyl acetate is preferred. The extract thus obtained can be evaporated to dryness to provide the crude antibiotic directly. Preferably, however, the extracts are processed further to obtain more purified forms of the antibiotic.

Alternatively, melrosporus can be separated from the culture medium by use of a strongly basic anion exchange resin. Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene cross-linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the tradenames Dowex 1, Dowex 2, Dowex 3, Amberlite IRA-400, Duolite A-102, and Permutit S-1.

As a further alternative, melrosporus can be recovered from the filtered culture medium or the organic extract by adsorption techniques, employing such adsorbents as silicic acid, decolorizing carbon or decolorizing resin (a suitable decolorizing resin is Permutit DR (U.S. Patent 2,702,263), alumina and Florisil (a synthetic silicate of the type described in U.S. Patent 2,393,625 and sold by the Floridin Co.). The adsorbed antibiotic can be removed from the adsorbent in relatively pure form by elution with a suitable organic solvent, e.g. one of those mentioned above in which melrosporus is soluble.

Salts of melrosporus are formed employing the free acid of melrosporus and an inorganic or organic base. The melrosporus salts can be prepared, as for example, by dissolving melrosphorus free acid in water, adding a dilute base until the pH of the solution is about 7 to 8, and freeze-drying the solution to provide a dried residue consisting of the melrosporus salt. Melrosporus salts which can be formed include the sodium, potassium, and calcium salts. Other salts of melrosporus, including those with organic bases such as primary, secondary, and tertiary monoamines as well as with polyamines, can also be formed using the above-described or other commonly employed procedures. Salts of melrosporus can be used for the same biological purposes as the free acid.

The new compound of the invention, melrosporus, has a broad antibacterial spectrum as shown in Table IV, and it also inhibits the growth of fungi as shown in Table V. The antibacterial spectrum was determined by using a tube dilution assay procedure with the media being BHI (Brain Heart Infusion broth, Difco, Detroit, Michigan). Assay tubes (18 x 150 mm.) were prepared in the customary manner as set out in Snell, E. E., Vitamin Methods, vol. I, Academic Press, Inc., New York, 1950, page 327. Test organisms grown for 18 hours at 37° C. were used to inoculate the test medium.

*Table IV*

ANTIBACTERIAL ACTIVITY OF MELROSPORUS

| Test organism: | M.I.C.[1] ($\gamma$/ml.) |
|---|---|
| Bacillus subtilis | 4 |
| Diplococcus pneumoniae | 2 |
| Escherichia coli | 16 |
| Klebsiella pneumoniae | 8 |
| Proteus vulgaris | 8 |
| Pseudomonas aeruginosa | 125 |
| Salmonella paratyphi | 250 |
| Salmonella pullorum | 8 |
| Salmonella typhi | 32 |
| Staphylococcus aureus | 16 |
| Staphylococcus albus | 8 |
| Streptococcus faecalis | 32 |

[1] M.I.C.=minimum inhibitory concentration.

*Table V*

ANTIFUNGAL ACTIVITY OF MELROSPORUS

| Fungi | Inhibition of Growth | |
|---|---|---|
| | 1,000$\gamma$ per ml. | 10$\gamma$ per ml. |
| Nocardia asteroides | − | + |
| Blastomyces dermatitidis | − | + |
| Coccidioides immitis | − | + |
| Phialophora verrucosa | − | + |
| Cryptococcus neoformans | − | + |
| Histoplasma capsulatum | − | + |
| Sporotrichum schenckii | − | + |
| Monosporium apiospermum | − | + |
| Trichophyton rubrum | − | + |
| Microsporum canis | − | + |
| Candida albicans | ± | + |

−=complete inhibition.
±=partial inhibition.
+=no inhibition.

The new compound of the invention, melrosporus, is active against *Bacillus subtilis* and can be used to minimize or prevent odor in fish and fish crates caused by this organism. The new compound can be used as a disinfectant on various dental and medical equipment contaminated with *Staphylococcus albus* or *Staphylococcus aureus*; it can also be used as a disinfectant on washed and stacked food utensils contaminated with *Staphylococcus aureus*.

The following examples are illustrative of the process and products of the present invention but are not to be construed as limiting. All percentages are by weight and all solvent mixture proportions are by volume unless otherwise noted.

EXAMPLE 1—MELROSPORUS

A. *Fermentation.*—A soil stock of *Streptomyces fervens* var. *melrosporus*, NRRL 3117, was used to inoculate a series of 500-ml. Erlenmeyer flasks each containing 100 ml. of seed medium consisting of the following ingredients:

| | Gm./liter |
|---|---|
| Glucose monohydrate | 10 |
| Yeast-O-Lac [1] | 10 |
| NZ amine B [2] | 5 |
| Tap Water | Balance |

[1] Partial yeast autolyzate mixed with milk solids, Vico Products Corp., Chicago, Ill.
[2] Enzymatic digest of casein, Sheffield Chemical Co., Norwich, N.Y.

The seed flasks were grown for 36 hours at a temperature of 28° C. on a Gump rotary shaker operating at 250 r.p.m. with a 2½-inch stroke.

Twenty 500-ml. Erlenmeyer flasks, each containing 100 ml. of the following sterile medium, were inoculated with material from the seed flasks, described above. Five ml. of seed material was aseptically added to each flask.

| | Gm./liter |
|---|---|
| Glucose monohydrate | 50 |
| Corn steep liquor | 20 |
| Fish meal | 20 |
| Lard oil | 2 |
| Tap water | Balance |

The pH was adjusted to 7.2 with sodium hydroxide before sterilization. The culture was grown for 72 hours at a temperature of 28° C. on a Gump rotary shaker operating at 250 r.p.m. Pre-harvest *S. gallinarum* assay (pH 5.0, phosphate buffer) was 62 biounits per ml. (310 mcg./ml.) melrosporus. Average dry solids, 25 mg./ml.

B. *Extraction.*—Whole broth (1720 ml) from the above fermentation was filtered using approximately 6% diatomaceous earth as a filter aid. The filter cake was washed with approximately ⅓ broth volume of water and the filtrate and wash were combined. The filtered broth (1710 ml.) was cooled to less than 5° C., adjusted to pH 2.0 with sulfuric acid, and extracted twice with ⅓ volume portions of ethyl acetate. The ethyl acetate extracts were combined (900 ml.), cooled to less than 5° C., and washed with ½ vol. of water; the water was discarded. One-half volume of water was added to the cold, washed ethyl acetate extract, mixed well, and the mixture was adjusted to a pH of 8.0 with a 50% sodium hydroxide solution. The phases which developed were separated, and the aqueous phase was adjusted to a pH of 7.0 with dilute sulfuric acid and freeze-dried to yield 1.34 grams of melosporus assaying 17.5 biounits/mg. against *S. gallinarum*. (A biounit is that amount of antibiotic when dissolved in 0.08 ml. of the test solution and applied to a 12.7 mm. disk gives a 20 mm. zone of inhibition under standard microbiological conditions.)

C. *Purification.*—Melrosporus obtained from fermentations and extractions, as described above, was further purified by partition chromatography and by crystallization. For the partition chromatography a solvent system of cyclohexane, ethyl acetate, and McIlvaine's pH 3.5 buffer (7:3:2) was used. To prepare the column bed, 300 gm. of unwashed diatomaceous filter aid was slurried in approximately 3000 ml. of upper phase. One hundred and two milliliters of 0.1 M citric acid and 18 ml. of lower phase was then added with good agitation. The mixture was homogenized and then poured into a 2-inch I.D. glass column and packed to a constant height under 2–3 lbs. of air pressure; the bed height was about 28 inches. The charge for the above column was prepared by combining 110 gm. of crude melrosporus and 138 gm. of citric acid, and dissolving them in a mixture of 150 ml. of lower phase and 200 ml. of upper phase. To this was added 300 gm. of unwashed diatomaceous filter aid plus sufficient upper phase to make a pourable slurry. The mixture was homogenized well and packed on top of the column bed described above. The column was developed with upper phase at a rate of about 15 ml. per min. Twenty ml. fractions were collected and analyzed for solids. The result of these analyses are as follows:

| Fraction: | Solids (mg./ml.) |
|---|---|
| 50 | .30 |
| 60 | 4.05 |
| 70 | 7.95 |
| 80 | 8.05 |
| 90 | 7.78 |
| 100 | 7.40 |
| 110 | 6.83 |
| 120 | 5.78 |
| 130 | 4.19 |
| 140 | 3.12 |
| 150 | 2.66 |
| 160 | 2.12 |

Fractions 50–130 were pooled, concentrated to dryness in vacuo at less than 30° C., dissolved in 100 ml. of ethyl acetate and stirred with 5 gm. of activated carbon for an hour. The carbon was removed by filtration and washed with ethyl acetate. The carbon-treated ethyl acetate solution was concentrated to approximately 20 ml. at which point white crystals of melrosporus began to form. (If crystallization does not occur, cyclohexane may be added to induce it.) After chilling to 5° C., the crystals were filtered, washed with a small amount of cold ethyl acetate-cyclohexane (2:5) mixture and vacuum dried to a constant weight; yield, 2.5 gm. of white crystalline melrosporus.

CHEMICAL AND PHYSICAL PROPERTIES OF MALROSPORUS

Empirical Formula: $C_5H_7NO_4$

Elemental Analysis: C=41.43, 41.68; H=5.16, 5.06; N=9.36, 9.59; O=43.75.

Optical Rotation: $[\alpha]_D^{25}=+4°$ (c, 0.7, $H_2O$)

Solubility: Soluble in water, methanol, ethanol, ethyl acetate, 1-butanol, 2-butanol. Slightly soluble in ether, hexane and cyclohexane.

Ultraviolet Spectrum: The ultraviolet absorption spectrum of melrosporus as reproduced in FIGURE II of the drawing shows maximum absorptivity of 152 at 290 mμ.

Infrared spectrum: The infrared absorption spectrum of melrosporus suspended in mineral oil mull is reproduced in FIGURE I of the drawing. Melrosporus shows peaks at the following wave lengths expressed in reciprocal centimeters:

| | | |
|---|---|---|
| 3330 (W) | 1440 (S) | 978 (M) |
| 3090 (M) | 1421 (M) | 942 (W) |
| 3070 (M) | 1375 (S) | 890 (W) |
| 2950 (S) oil | 1360 (S) | 875 (W) |
| 2920 (S) oil | 1315 (M) | 865 (W) |
| 2850 (S) oil | 1280 (S) | 820 (W) |
| 2650 (W) | 1250 (M) | 760 (M) |
| 2570 (W) | 1208 (M) | 750 (W) |
| 1695 (S) | 1175 (W) | 715 (W) |
| 1600 (S) | 1161 (M) | 683 (W) |
| 1580 (S) | 1055 (W) | 656 (W) |
| 1560 (W) | 1005 (M) | |
| 1458 (M) oil | 990 (M) | |

Band intensities as indicated in the above IR spectra are referred to as "S," "M," and "W." They are approximated in terms of the backgrounds in the vicinity of the bands, an "S" band is of the same order of intensity as the strongest band in the spectrum; "M" and "W" bands, respectively, are between ⅓ and ⅔ as intense as the strongest band, and less than ⅓ as intense as the strongest band. These estimates are made on the basis of a percent transmission scale.

Molecular weight by titration: 147.

The novel compound of the invention, melrosporus, is further characterized by its inhibition of S–180 tumor cells and KB carcinoma tumor cells in tissue culture. Also, *Pseudomonas multocida* infected mice, treated subcutaneously with melrosporus, received slight protection at a dosage level of 80 and 160 mg./kg.

The safety and effectiveness of melrosporus in human therapy, however, has not yet been established.

We claim:

1. A composition of matter, assaying at least 12.4 mcg./mg. of melrosporus, a compound which
   (a) is effective in inhibiting the growth of various gram-positive and gram-negative bacteria;
   (b) is soluble in water, methanol, ethanol, ethyl acetate, 1-butanol, 2-butanol; slightly soluble in ether, hexane, and cyclohexane; and which in its essentially pure crystalline form
   (c) has the following elemental analysis: C, 41.43, 41.68; H, 5.16, 5.06; N, 9.36, 9.59; O, 43.75;
   (d) has the molecular weight of 147;
   (e) has a characteristic ultraviolet absorption spectrum with maximum absorptivity of 152 at 290 mμ in 95% ethanol as shown in FIGURE II of the drawing; and
   (f) has a characteristic infrared absorption spectrum as shown in FIGURE I of the accompanying drawing.

2. A compound as defined in claim 1, melrosporus, in its essentially pure form.

3. A compound selected from the group consisting of melrosporus, according to claim 1, and salts thereof with alkali metal, alkaline earth metals, and amines.

4. A process which comprises cultivating *Streptomyces fervens* var. *melrosporus* in an aqueous nutrient medium under aerobic conditions until substantial activity is imparted to said medium by production of melrosporus.

5. A process which comprises cultivating *Streptomyces fervens* var. *melrosporus* in an aqueous nutrient medium containing a source of assimilable carbohydrate and assimilable nitrogen under aerobic conditions until substantial activity is imparted to said medium by production of melrosporus and isolating the melrosporus so produced.

6. A process according to claim 5 in which the isolation comprises filtering the medium, extracting the filtrate with a water-immiscible solvent for melrosporus, and recovering melrosporus from the solvent extract.

7. A compound as defined in claim 1, melrosporus, in its essentially pure crystalline form.

No references cited.

JULIAN S. LEVITT, *Primary Examiner.*

JEROME D. GOLDBERG, *Assistant Examiner.*